(12) United States Patent
Fleming et al.

(10) Patent No.: US 11,441,321 B2
(45) Date of Patent: Sep. 13, 2022

(54) WORK PLATFORM

(71) Applicant: THE BOEING COMPANY, Chicago, IL (US)

(72) Inventors: Joshua Patrick Fleming, Mount Vernon, WA (US); Brian Lam, Lynnwood, WA (US)

(73) Assignee: THE BOEING COMPANY, Chicago, IL (US)

( * ) Notice: Subject to any disclaimer, the term of this patent is extended or adjusted under 35 U.S.C. 154(b) by 333 days.

(21) Appl. No.: 16/585,351

(22) Filed: Sep. 27, 2019

(65) Prior Publication Data

US 2021/0095482 A1 Apr. 1, 2021

(51) Int. Cl.

| | | |
|---|---|---|
| *E06C 1/39* | (2006.01) | |
| *B64D 39/04* | (2006.01) | |
| *B64F 5/40* | (2017.01) | |
| *E04G 1/00* | (2006.01) | |
| *E04G 1/24* | (2006.01) | |
| *E04G 5/14* | (2006.01) | |
| *B64F 5/10* | (2017.01) | |
| *E04G 5/00* | (2006.01) | |

(52) U.S. Cl.
CPC .................. *E04G 1/00* (2013.01); *B64F 5/10* (2017.01); *E04G 1/24* (2013.01); *E04G 5/007* (2013.01); *E04G 5/141* (2013.01); *E04G 2001/242* (2013.01); *E06C 1/39* (2013.01)

(58) Field of Classification Search
CPC ........ E04G 2001/242; E04G 2001/155; E04G 2001/157; E04G 11/46; E04G 1/00; E04G 1/24; E04G 1/22; E04G 1/14; E04G 1/15; E04G 1/154; E04G 1/36; E04G 1/28; E04G 1/32; E04G 5/007; E04G 5/141; E04G 5/10; E04G 5/00; E04G 5/004; E04G 5/06; E04G 5/061; E04G 5/142; E04G 5/16; E04G 2005/008; E04G 7/08; E04G 7/22; E04G 7/301; E04G 3/28; E04G 21/166; E06C 1/39; E06C 1/12; E06C 7/182; E06C 7/183; B64F 5/10; B64F 5/40; B64F 5/50; B64F 5/60; B64F 5/00; B64F 5/20; B64F 5/23; B64F 5/27; B64F 5/305; B64F 5/45; B66F 11/04; B23Q 3/062; Y10T 29/49718; Y10T 29/49998; E01D 19/106
See application file for complete search history.

(56) References Cited

U.S. PATENT DOCUMENTS 3,256,955 A * 6/1966 Khachatoo ................ B64F 5/40
182/180.1
4,520,996 A * 6/1985 Viglione ................ B66F 11/042
254/9 C

(Continued)

*Primary Examiner* — Brian D Mattei
*Assistant Examiner* — Kathleen M. McFarland
(74) *Attorney, Agent, or Firm* — The Small Patent Law Group LLC; Philip S. Hof (57) ABSTRACT

A work platform includes a frame and a deck. The frame has a plurality of frame members that are interconnected. The frame members define a trough that extends a length of the frame and is configured to accommodate a refueling boom of an aircraft such that the refueling boom extends through the frame within the trough. The deck is mounted to the frame to provide a stand. The deck includes a first deck panel and a second deck panel spaced apart from each other to define an opening to the trough.

20 Claims, 8 Drawing Sheets

(56) References Cited

U.S. PATENT DOCUMENTS

| | | | | |
|---|---|---|---|---|
| 5,363,940 | A * | 11/1994 | Fahrion | B64F 5/10 |
| | | | | 182/115 |
| 5,423,396 | A * | 6/1995 | Fahrion | B64F 5/10 |
| | | | | 182/115 |
| 6,782,665 | B2 * | 8/2004 | Fahrion | B64F 5/40 |
| | | | | 182/36 |
| 9,249,733 | B2 * | 2/2016 | Hallam | F02C 7/20 |
| 9,315,137 | B1 * | 4/2016 | Davis | B60P 1/025 |
| 9,441,382 | B2 * | 9/2016 | Hokanson | E06C 7/182 |
| 2011/0005862 | A1 * | 1/2011 | Krock | E06C 1/39 |
| | | | | 182/124 |
| 2012/0056364 | A1 * | 3/2012 | DuBose | B23Q 3/062 |
| | | | | 29/559 |
| 2012/0110816 | A1 * | 5/2012 | Groves | F01D 25/285 |
| | | | | 254/7 C |
| 2016/0288888 | A1 * | 10/2016 | Peterson | B63C 3/06 |
| 2017/0253167 | A1 * | 9/2017 | Gill, III | B60P 3/40 |
| 2018/0119432 | A1 * | 5/2018 | Finlay | E04G 5/16 |

* cited by examiner

WORK PLATFORM

FIELD

The present disclosure generally relates to ground support equipment, and more particularly to a work platform for accommodating a refueling boom of an aircraft.

BACKGROUND

Some tanker aircraft have a refueling boom for aerial refueling of other aircraft. The refueling boom may extend along a bottom of the fuselage at or proximate to the tail end of the aircraft. In a secured or raised position, the refueling boom may obstruct access to one or more areas of the aircraft required during maintenance. For example, the refueling boom may obstruct access to one or more hatches along the fuselage for servicing and functional testing of mechanical equipment and machinery, such as the auxiliary power unit (APU). The refueling boom obstructs access by prohibiting a conventional work platform or aerial lift from being moved directly underneath the one or more hatches to enable a technician to enter the one or more hatches. Attempting to move the refueling boom sideways to create space for fitting a conventional work platform or aerial lift underneath the one or more hatches can damage the boom or may fail to provide adequate space.

SUMMARY

Certain embodiments of the present disclosure provide a work platform that includes a frame and a deck. The frame has a plurality of frame members that are interconnected. The frame members define a trough that extends a length of the frame and is configured to accommodate a refueling boom of an aircraft such that the refueling boom extends through the frame within the trough. The deck is mounted to the frame to provide a stand. The deck includes a first deck panel and a second deck panel spaced apart from each other to define an opening to the trough.

Certain embodiments of the present disclosure provide a work platform that includes a frame, a deck, and a support member. The frame extends a length from a first end of the frame to a second end of the frame opposite the first end. The frame defines a trough that extends the length of the frame and is configured to accommodate a refueling boom of an aircraft such that the refueling boom extends through the frame within the trough. The deck is mounted to the frame to provide a stand, and the deck defines an opening to the trough. The support member is mechanically connected to the frame in-line with the trough. The support member is non-rigid and is configured to hold the refueling boom when the refueling boom is disposed within the trough of the frame.

Certain embodiments of the present disclosure provide a method of assembling a work platform. The method includes assembling a frame that has a plurality of frame members that are interconnected. The frame is assembled such that the frame members define a trough that extends a length of the frame and is configured to accommodate a refueling boom of an aircraft such that the refueling boom extends through the frame within the trough. The method also includes mounting a deck to the frame to provide a stand. The deck includes a first deck panel, a second deck panel, and one or more lid panels. The first deck panel is spaced apart from the second deck panel to define an opening to the trough. The one or more lid panels are selectively movable between a closed position and an open position. The one or more lid panels in the closed position extend across the trough to cover the opening between the first and second deck panels, and the one or more lid panels in the open position do not extend across the trough.

DETAILED DESCRIPTION

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide work platforms designed to accommodate a refueling boom or another extension protruding from an aircraft to enable a technician on the work platforms to access areas of the aircraft that would otherwise be obstructed by the refueling boom and/or extension. The work platform includes a frame that extends a length from a first end of the frame to a second end opposite the first end. The frame defines a trough that extends the length of the frame and is configured to accommodate a refueling boom of an aircraft such that the refueling boom extends through the frame. The work platform includes a deck mounted to the frame to provide an elevated working stand for a technician to access the aircraft, and in particular areas of the aircraft above the refueling boom. The deck defines an opening to the trough. For example, the refueling boom may enter the trough by being lowered into the trough from above through the opening in the deck. In one or more embodiments, the work platform includes a support member for structurally supporting at least some of the weight of the refueling boom when the boom is in the lowered position within the trough. Furthermore, the deck of the work platform includes one or more lid panels that are selectively movable to cover the opening to the trough once the refueling boom is loaded into the trough. The lid panels covering the opening extend above the refueling boom and allow the technician to freely move about the deck without risk of falling into the trough.

The work platforms described herein enable the refueling boom to be lowered down into the trough of the frame, avoiding the risk of damage associated with pushing the refueling boom sideways when the boom is in the lowered position. By accommodating the refueling boom, the work platforms described herein can be located underneath desired areas of the aircraft, providing a technician on the deck uncompromised access to such access hatches or compartments without the technician adopting an awkward body posture. In a non-limiting example, the work platform provides access to an auxiliary power unit (APU) compartment of the aircraft, and the deck of the platform has adequate spacing to enable removal and replacement of APU components during maintenance.

Examples described herein provide ground support equipment that enables a technician to access areas of an aircraft obstructed by a refueling boom of the aircraft, such as one or more hatches along the fuselage of the aircraft, without disconnecting the refueling boom, risking damage to the refueling boom, or risking injury to the technician.

The work platforms may improve the efficiency of maintenance procedures that require lowering the refueling boom. For example, instead of removing the boom or trying to push the boom sideways to create clearance for a lift, the work platforms described herein merely require proper positioning of the work platform relative to the boom and then lowering the intact boom into the trough through the opening in the deck. The efficiency may also be increased by incorporating a support member into the work platform for supporting some of the weight of the boom, which avoids having to retrieve and position a support device that is separate and discrete from the stand or lift utilized by the technician. The increased efficiency described herein may refer to reduced time spent, reduced cost, and/or reduced energy consumed.

Figure 1:
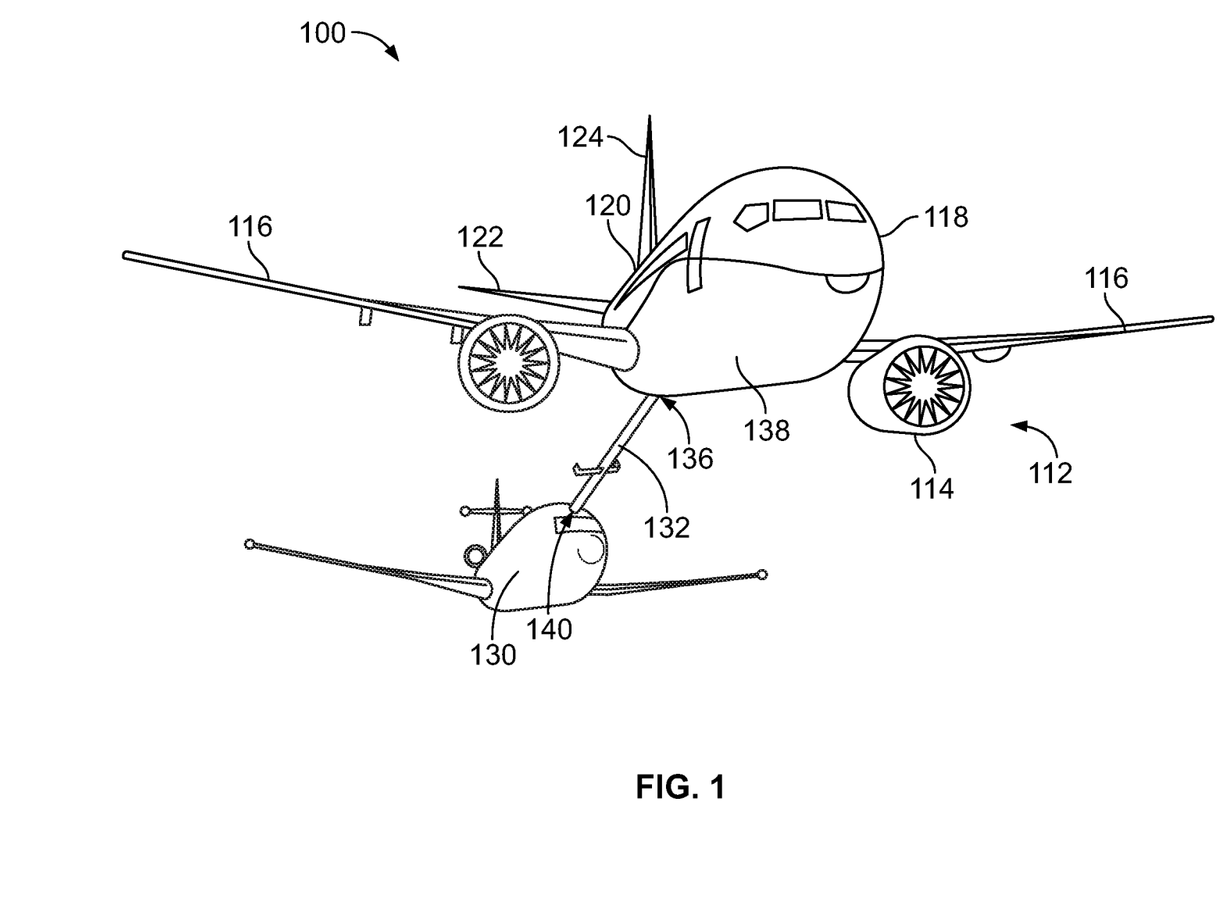
FIG. 1 is a diagrammatic representation of a front perspective view of an aircraft.

FIG. 1 is a diagrammatic representation of a front perspective view of an aircraft 100, according to an embodiment of the present disclosure. The aircraft 100 includes a propulsion system 112 that may include two turbofan engines 114, for example. Optionally, the propulsion system 112 may include more engines 114 than shown. The engines 114 are carried by wings 116 of the aircraft 100. In other embodiments, the engines 114 may be carried by a fuselage 118 and/or an empennage 120. The empennage 120 may also support horizontal stabilizers 122 and a vertical stabilizer 124. The fuselage 118 of the aircraft 100 defines an interior cabin, which may include a cockpit, one or more work sections (for example, fuel tanks, data collection equipment, cargo areas, and the like), and an aft section.

The aircraft 100 is a tanker aircraft that is configured to aerially refuel other aircraft, such that fuel is transferred from the tanker aircraft 100 to the receiving aircraft 130 mid-air during flight. The aircraft 100 includes a refueling boom 132 that is connected to the fuselage 118 at or near an aft end of the aircraft 100 proximate to the empennage 120. The refueling boom 132 defines a tube through which fuel is conveyed from the aircraft 100 to the receiving aircraft 130. The refueling boom 132 extends a length from a proximal end 136 connected to a bottom side 138 of the fuselage 118 to a distal end 140 that releasably connects to a port of the receiving aircraft 130. The refueling boom 132 is movable relative to the aircraft 100 between a raised position and a lowered position. The boom 132 is in the lowered position to refuel the receiving aircraft 130 and is typically kept in the raised position throughout the remainder of the flight and when on the ground. During maintenance, however, the refueling boom 132 may be lowered to the lowered position while the aircraft 100 is on the ground in order to provide access to one or more areas along the bottom side 138 of the fuselage 118, such as hatches or compartments, as described herein.

Figure 2:
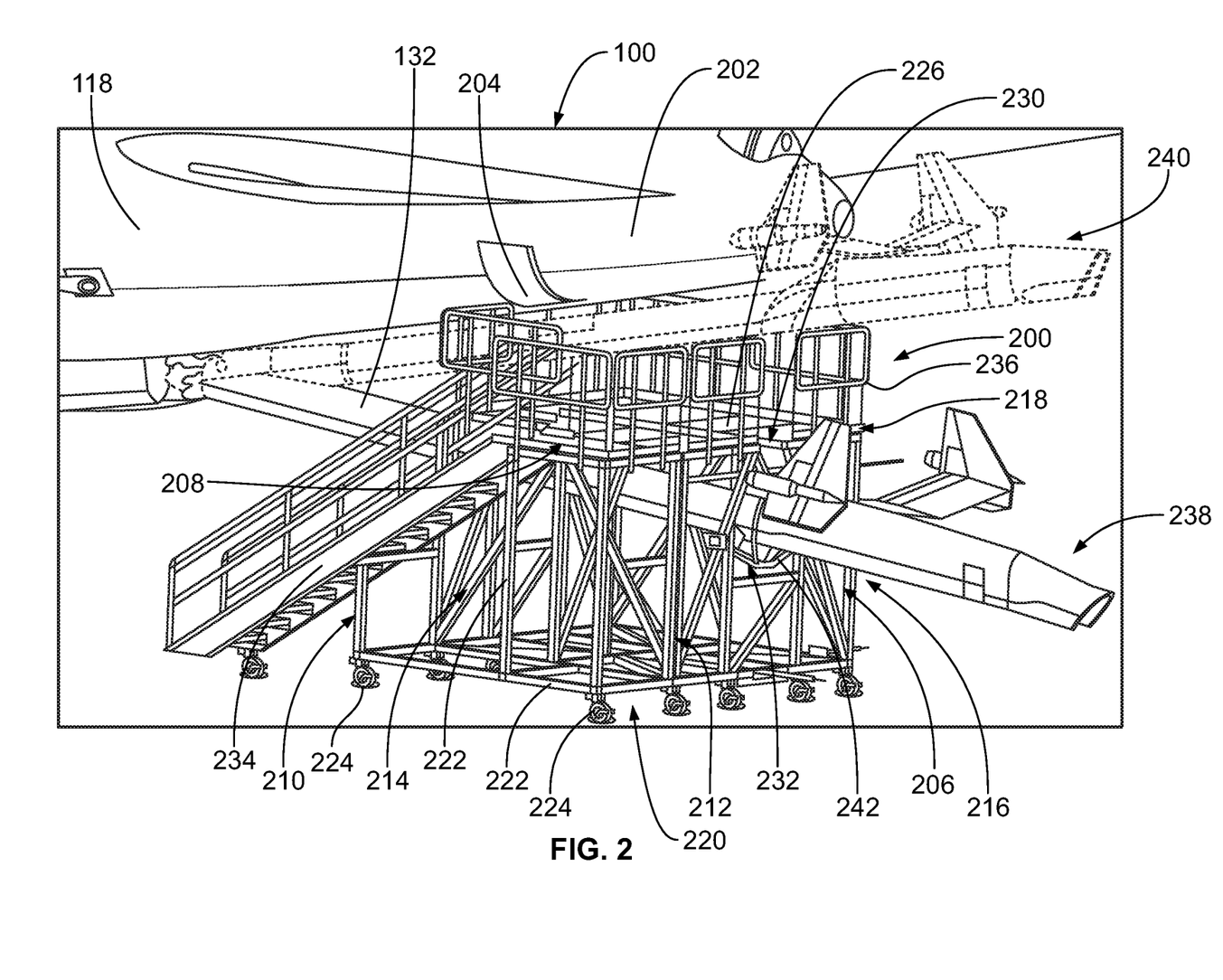
FIG. 2 is a rear perspective view of the aircraft shown in FIG. 1 and a work platform according to an embodiment of the present disclosure.

FIG. 2 is a rear perspective view of the aircraft 100 shown in FIG. 1 and a work platform 200 according to an embodiment. The work platform 200 is positioned underneath an aft or tail segment 202 of the fuselage 118. The work platform 200 aligns with the refueling boom 132. The work platform 200 is designed to enable a technician or other person to access the tail segment 202 of the fuselage 118, which would typically be obstructed by refueling boom 132. For example, the tail segment 202 may include one or more access hatches 204. The one or more access hatches 204 may include an APU hatch that provides access to the APU of the aircraft 100. The technician can utilize the work platform 200 to perform maintenance on the aircraft 100, such as by servicing and/or testing the APU and/or other equipment and machinery within the one or more access hatches 204.

Figure 3:
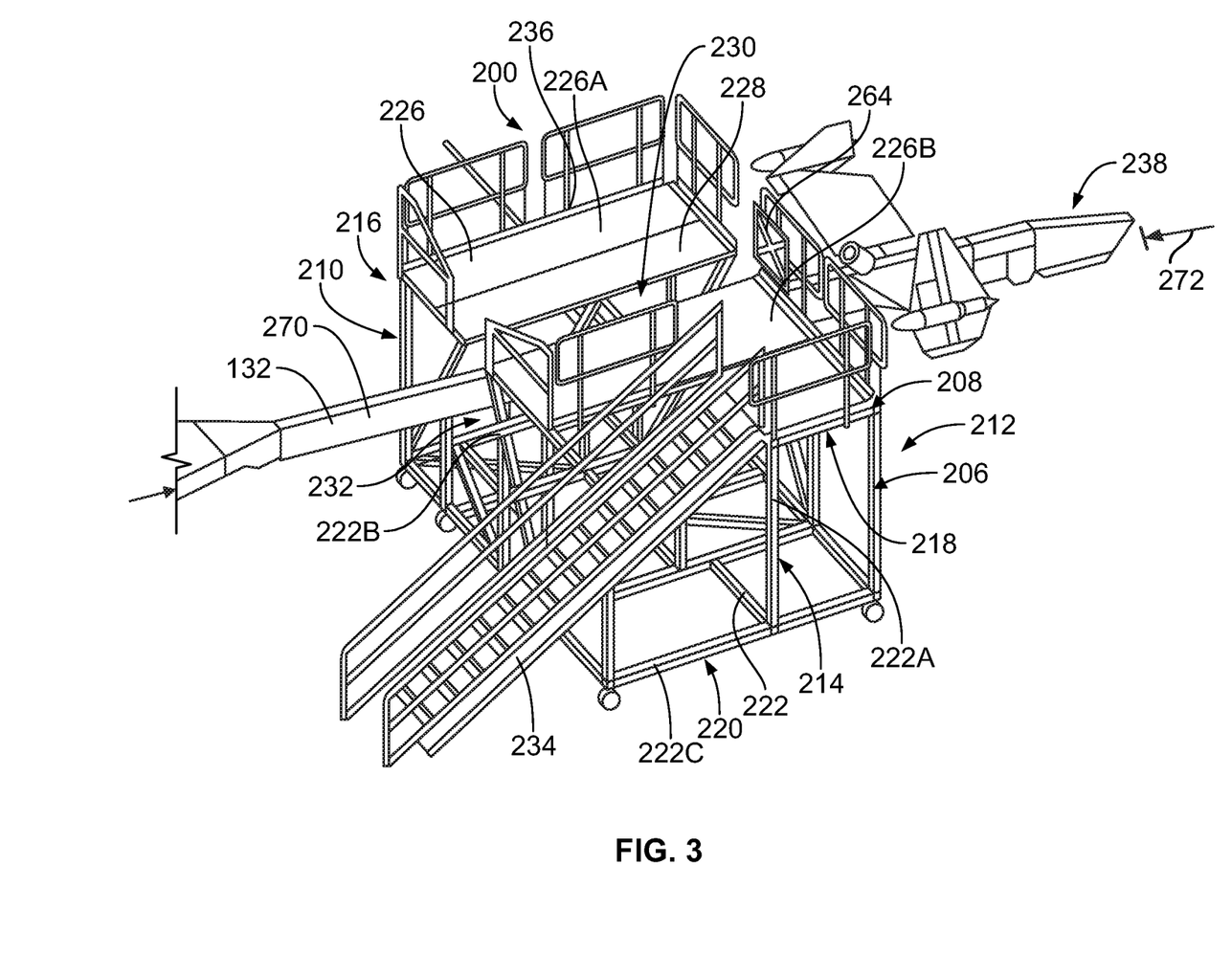
FIG. 3 is a front perspective view of the work platform and a refueling boom of the aircraft.

With continued reference to FIG. 2, FIG. 3 is a front perspective view of the work platform 200 and the refueling boom 132 of the aircraft 100. FIG. 3 does not depict other portions of the aircraft 100 to better illustrate the work platform 200. The work platform 200 includes a frame 206 and a deck 208 that is mounted on the frame 206. The frame 206 extends a length from a first end 210 of the frame 206 to a second end 212 of the frame 206. The second end 212 is opposite the first end 210. The first end 210 and the second end 212 are also referred to herein as front end 210 and back end 212 (e.g., conforming with the front and back of the aircraft), respectively. The frame 206 extends a width from a first side 214 of the frame 206 to a second side 216 of the frame 206 opposite the first side 214. A height of the frame 206 is defined from a top end 218 of the frame 206 to a bottom end 220 of the frame 206. The frame 206 includes a plurality of elongated frame members 222. The frame members 222 are interconnected to structurally support the frame 206 and loads exerted on the frame 206. For example, some of the frame members 222 are oriented vertically, some are oriented horizontally, and others are oriented transverse to both the vertical and horizontal frame members 222.

In the illustrated embodiment, the work platform 200 is portable or mobile. For example, the frame 206 includes casters 224 mounted to the bottom end 220. The casters 224 include wheels that roll along the floor or ground to enable the work platform 200 to be moved into a designated position relative to the aircraft 100. The casters 224 may include a locking mechanism for fixing (e.g., retaining) the work platform 200 in the designated position once the designated position is achieved. Optionally, the work platform 200 may include feet or jacks used to stabilize the work platform 200. For example, once the work platform 200 is rolled into the designated position relative to the aircraft 100, the feet or jacks may be deployed to at least partially lift the weight of the work platform 200 off the casters 224. The feet or jacks may have adjustable heights to accommodate variations and/or slopes along the floor or ground.

The deck 208 is mounted to the frame 206 at or proximate to the top end 218. The deck 208 provides a work surface or stand that is elevated off the floor or ground. The technician or other person on the work platform 200 stands on the deck 208 to access the aircraft 100, such as the one or more hatches 204 thereof. The deck 208 includes multiple deck panels 226 and one or more lid panels 228. The deck panels 226 include a first deck panel 226A and a second deck panel 226B that are spaced apart from each other by a gap which represents an opening 230 to a trough 232 or channel within the frame 206. The first and second deck panels 226A, 226B may be coplanar. The one or more lid panels 228 are movable relative to the deck panels 226 (e.g., 226A, 226B) to selectively cover the opening 230.

The work platform 200 optionally includes a staircase 234 mounted to the frame 206 and extending from the floor or ground surface to the deck 208. The staircase 234 is climbed by the technician to reach the deck 208. In the illustrated embodiment, the staircase 234 is located along the first side 214 of the frame 206, but the staircase 234 may be located along the second side 216 in an alternative embodiment. The staircase 234 is spaced apart from the refueling boom 132 to avoid interference with the movement of the boom 132. Instead of, or in addition to, the staircase 234, the work platform 200 optionally may include a ladder and/or a powered lift to convey people and/or supplies between the floor or ground and the deck 208. Guard rails 236 surround a perimeter of the deck 208 for safety. The guard rails 236 project upwards from the deck 208 to provide barriers. The guard rails 236 are mounted to the frame 206 and/or the deck 208.

The frame 206 defines the trough 232, which is a channel or void elongated the length of the frame 206 from the front end 210 to the back end 212. The trough 232 is sized and shaped to accommodate the refueling boom 132. For example the trough 232 may be wider than a shaft portion 270 of the refueling boom 132 to receive the boom 132 therein without striking the frame 206. The trough 232 may also be shaped to support the boom 132 along a length 272 of the boom 132 such that transaxial motion (e.g., sway) is reduced or essentially eliminated. The opening 230 in the deck 208 provides access to the trough 232. The trough 232 may be defined by various frame members 222 of the frame 206.

In FIGS. 2 and 3, the refueling boom 132 is shown in the lowered position 238. FIG. 2 depicts the raised position 240 of the refueling boom 132 in phantom. When the work platform 200 is in position relative to the aircraft 100, the refueling boom 132 is lowered from the raised position 240 through the opening 230 of the deck 208 into the trough 232. Lowering the refueling boom 132 creates space between the boom 132 and the tail segment 202 of the fuselage 118. For example, the space enables a technician on the deck 208 to enter the one or more access hatches 204. As another example, the space enables a technician to perform maintenance on the boom 132 or the tail segment 202. For example, the technician has room to open the door or doors of a hatch 204 to manually reach devices, equipment, machinery, and/or the like within the hatch 204. The technician may service and/or test such devices, equipment, machinery, and/or the like while standing on the deck 208 and/or by climbing from the deck 208 at least partially into the hatch 204.

The refueling boom 132 in the lowered position 238 longitudinally extends through the length of the frame 206, protruding beyond both the front end 210 and the back end 212. The portion of the refueling boom 132 disposed between the front and back ends 210, 212 is vertically disposed between the top end 218 and the bottom end 220 of the frame 206. For example, the refueling boom 132 passes through the work platform 200 under the deck 208, such that the refueling boom 132 does not interfere with the movements of the technician or other person standing on the deck 208.

In one or more embodiments, the work platform 200 also includes a support member 242 as shown in FIG. 2. The support member 242 is mechanically connected to the frame 206 in-line with the trough 232. The support member 242 is configured to engage the refueling boom 132 to support at least some of the weight of the refueling boom 132 when the boom 132 is in the lowered position 238. The support member 242 is non-rigid. For example, the support member 242 may include one or more straps, netting, cords, or the like. In other examples, other configurations are contemplated, such as a rigid support member that is coupled to the frame 206 via non-rigid or extendable coupler members (e.g., springs, compressible objects, or the like).

Figure 4:
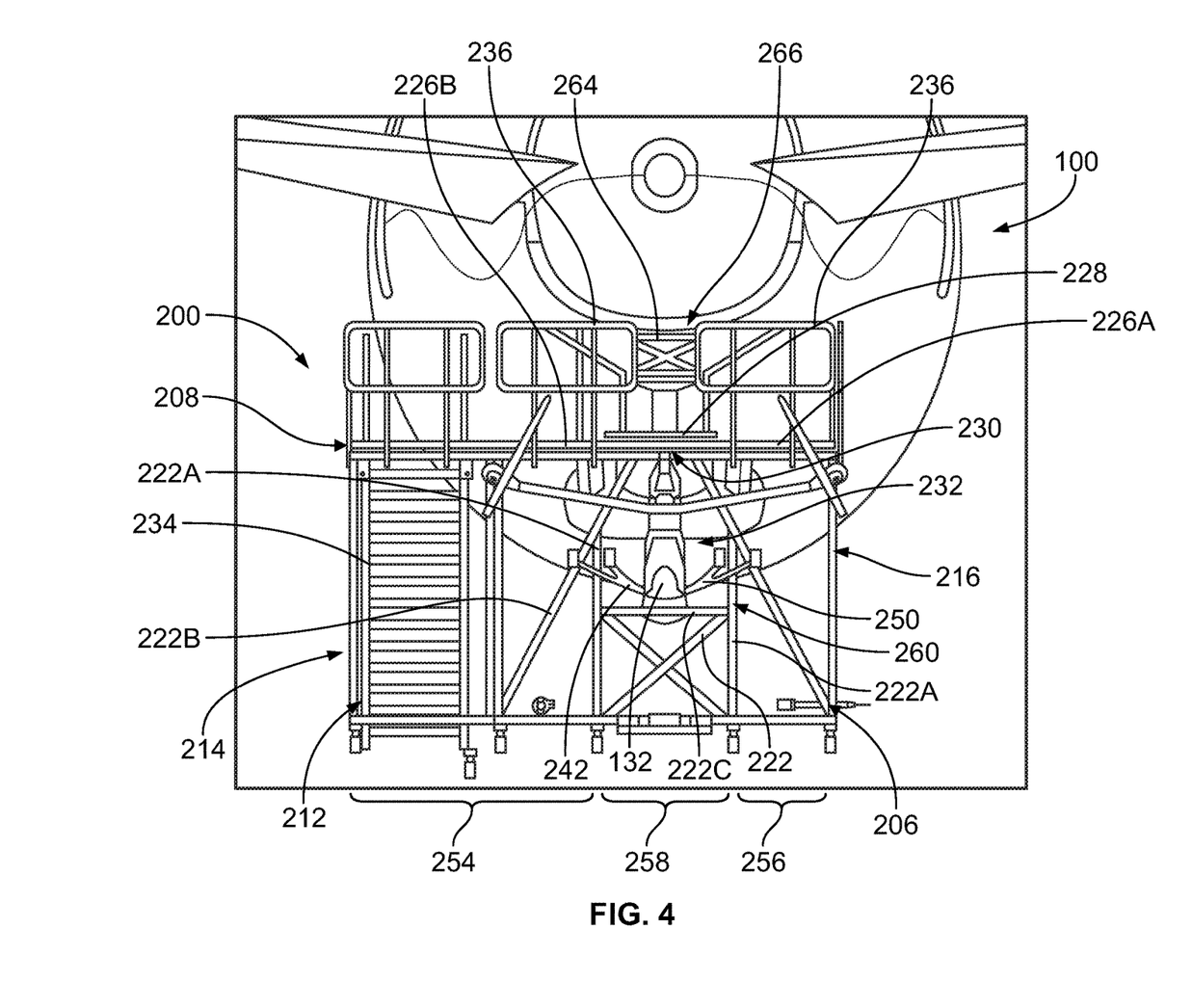
FIG. 4 is a rear view of the aircraft and the work platform according to an embodiment of the present disclosure.

FIG. 4 is a rear view of the aircraft 100 and the work platform 200 according to an embodiment. The refueling boom 132 is shown lowered into the trough 232 of the frame 206. The refueling boom 132 is supported, at least in part, by the support member 242. In the illustrated embodiment the support member 242 is affixed to frame members 222 and located along the length of the frame 206. More specifically, the support member 242 is located along the length of the frame 206 at or proximate to the back end 212. The support member 242 in the illustrated embodiment is mechanically attached to frame members 222 that are disposed along opposite sides of the trough 232. For example, the support member 242 may be affixed, via fasteners, to a pair of vertical frame members 222A and a pair of angled frame members 222B. The angled frame members 222B are oriented transverse to the vertical frame members 222A. The support member 242 extends across the trough 232 and cradles the refueling boom 132. For example, the support member 242 may include one or more straps 250 that engage and cradle a bottom perimeter region of the boom 132. In an alternative embodiment, instead of one or more straps 250, the support member 242 may include a compressible material in the form of a foam or pad affixed to one or more frame members 222, such as a horizontal frame member 222C.

The frame 206 includes a first section 254 that is disposed between the trough 232 and the first side 214. A second section 256 of the frame 206 is disposed between the trough 232 and the second side 216. The first section 254 is connected to the second section 256 via a group 258 of multiple frame members 222 that extend from the first section 254 to the second section 256 under the trough 232. The group 258 includes horizontal frame members 222C that define a bottom 260 of the trough 232. Accordingly in this example, the work platform 200 is not two discrete work stands or lifts disposed along opposite sides of the refueling boom 132 with a deck panel spanning the gap. Instead, the frame 206 has a unitary, one-piece construction with an arrangement of frame members 222 specifically designed to support loads via the deck 208 and via the support member 242, while defining the trough 232 that is sized and shaped to accommodate the boom 132 therein. The trough 232 is spaced apart from each of the first side 214 and the second side 216 of the frame 206. The first section 254 is wider than the second section 256 in FIG. 4 due to the presence of the staircase 234. Optionally, ignoring the width attributable to the staircase 234, the trough 232 may be centrally located along the width of the frame 206.

When the refueling boom 132 is disposed within the trough 232 as shown in FIG. 4, one or more operations may occur along the work platform 200 prior to the technician working on the aircraft 100. For example, the one or more lid panels 228 are moved from an open position, in which the lid panels 228 are recessed or retracted away from the opening 230, to a closed position. FIG. 4 shows a lid panel 228 in the closed position. In the closed position, the one or more lid panels 228 extend across the trough 232 to cover the opening 230. For example, the lid panel 228 shown in FIG. 4 extends from the first deck panel 226A to the second deck panel 226B. The lid panel 228 is located above the portion of the refueling boom 132 that is disposed in the trough 232. The one or more lid panels 228 are moved to the open position to enable the boom 132 to enter into the trough 232 and exit the trough 232 through the opening 230. The one or more lid panels 228 are moved to the closed position to provide a continuous work stand or surface along the deck 208 and prevent any risk of the technician falling into the trough 232.

In addition to closing the one or more lid panels 228 to cover the opening 230, FIG. 4 also shows a gate 264 that extends between two guard rails 236 located on opposite sides of the opening 230. The gate 264 is pivotable between a closed position and an open position. The gate 264 is in the closed position in FIG. 4, such that the gate 264 spans a gap 266 defined between the two guard rails 236. The gap 266 aligns with the opening 230 of the deck 208. For example, the refueling boom 132 extends through the gap 266 while the boom 132 is lowered into the trough 232 and raised out of the trough 232. In the closed position, the gate 264 is mechanically secured to both guard rails 236 to provide a continuous barrier along the back edge of the work platform 200 between the first side 214 and the second side 216. The gate 264 may uncouple from one of the guard rails 236 and swing out of the gap 266 to achieve the open position. The gate 264 in the open position permits unobstructed movement of the refueling boom 132 through the gap 266 between the guard rails 236. The gate 264 shown in FIG. 4 is located at the back end 212 of the frame 206. Optionally, the work platform 200 may include a second gate that aligns with the opening 230 at the front end 210 of the frame 206.

Figure 5:
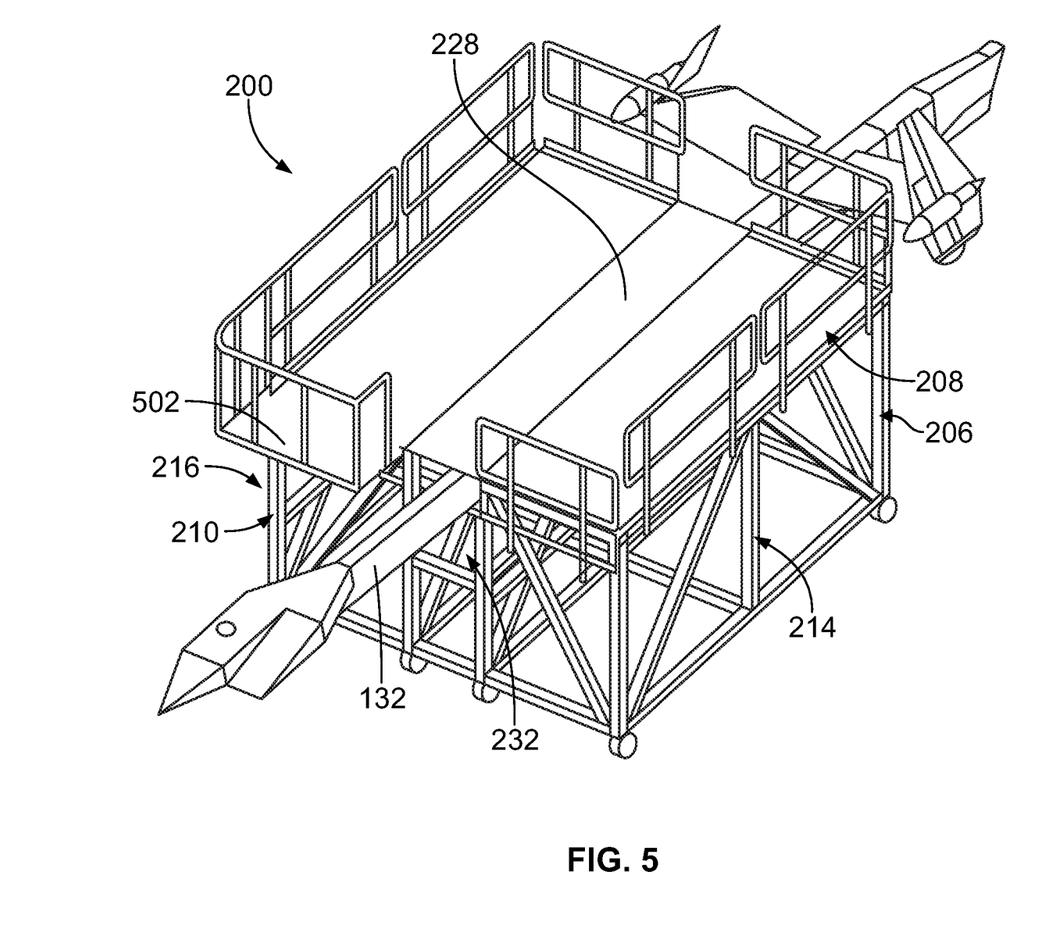
FIG. 5 is a front perspective view of the work platform and the refueling boom of the aircraft according to an alternative embodiment.

FIG. 5 is a front perspective view of the work platform 200 and the refueling boom 132 of the aircraft 100 according to an alternative embodiment. The work platform 200 in FIG. 5 lacks the staircase 234 shown in FIGS. 2 through 4. The work platform 200 may include a ladder and/or a powered lift instead. The trough 232 is centrally located along a width of the frame 206 between the first and second sides 214, 216. The deck 208 of the work platform 200 includes an extended region 502. The extended region 502 projects forward beyond the front end 210 of the frame 206. The extended region 502 may be specifically designed to enable a technician on the deck 208 to access a corresponding hatch along the aircraft. For example, the size and shape of the deck 208 may be designed to allow the technician to access multiple different hatches without repositioning the work platform 200 relative to the aircraft 100. The other parts of the work platform 200 shown in FIG. 5 may be the same or similar to the work platform 200 described with reference to FIGS. 2 through 4. The lid panel 228 is shown in the closed position, extending across the trough 232 above the refueling boom 132 to provide a continuous work surface for the technician on the deck 208.

Figure 6:
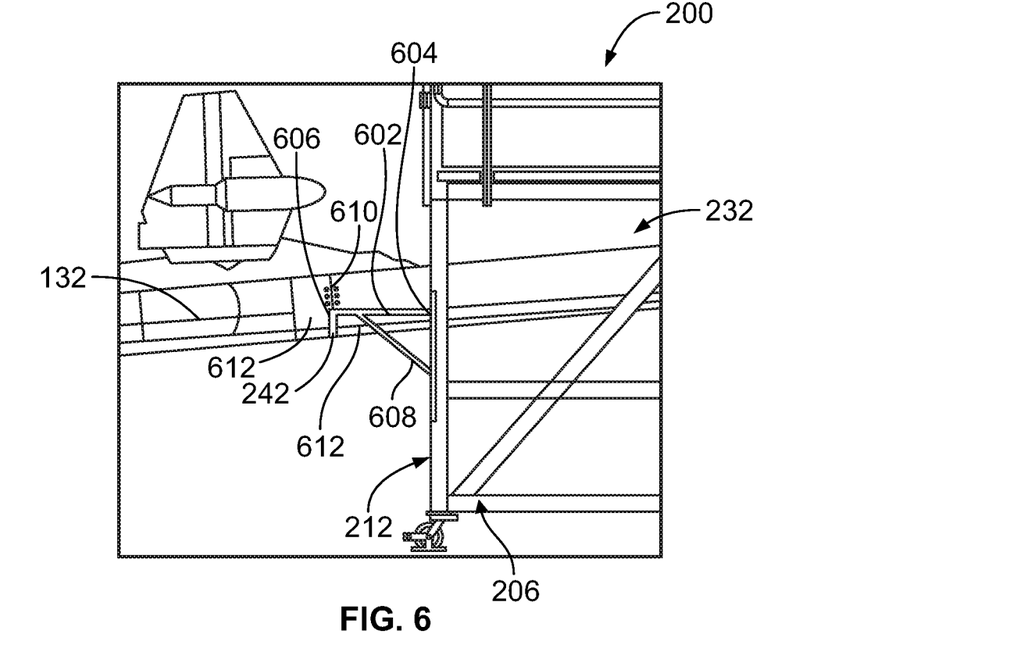
FIG. 6 is a side view of a rear portion of the work platform and the refueling boom according to another alternative embodiment.

FIG. 6 is a side view of a rear portion of the work platform 200 and the refueling boom 132 according to another alternative embodiment. The work platform 200 includes the integrated support member 242 for engaging and supporting at least some of the weight of the refueling boom 132. The support member 242 may include one or more straps, netting, cords, or the like. Unlike the embodiment shown in FIGS. 2 through 4, the support member 242 is located outside of the length of the frame 206. For example, the work platform 200 in FIG. 6 includes two cantilevered extension arms 602 that are mounted to the back end 212 of the frame 206. Only one of the two extension arms 602 is shown in FIG. 6 because the other, which is a replica or copy of the first, is behind the refueling boom 132. The extension arms 602 may be supported by respective brace elements 608 that extend from the frame 206 to the extension arms 602 and are angled transverse to the extension arms 602. Each of the extension arms 602 has a fixed end 604 and a free end 606 opposite the fixed end 604. The fixed end 604 is affixed to the frame 206 via welding, fasteners (e.g., bolts, bayonet couplings, etc.), or the like. The free end 606 is spaced apart from the frame 206. The support member 242 is connected to the extension arm 602 at or proximate to the free end 606. Therefore, along a length axis, the back end 212 of the frame 206 is disposed between the support member 242 and the front end 210 of the frame 206.

Supporting the refueling boom 132 at a contact location that is distal of the portion of the boom 132 within the trough 232 may reduce the load on the support member 242 (and the frame 206), relative to supporting a more proximal location of the boom 132, due to the increased distance from the pivot point of the boom 132. Furthermore, the construction of the refueling boom 132 may motivate the positioning of the support member 242 relative to the frame 206. For example, the support member 242 may be positioned to align with and engage a seam 610 of the boom 132 where adjacent boom panels 612 are affixed to the structure of the boom 132. The seam 610 may represent an area that is able to withstand the forces exerted by the support member 242 on the refueling boom 132. Areas spaced apart from the seams 610 may be less structurally secure and more prone to denting and/or bending at the location of the support member 242 when the support member 242 is used to support weight of the boom 132.

Figure 7:
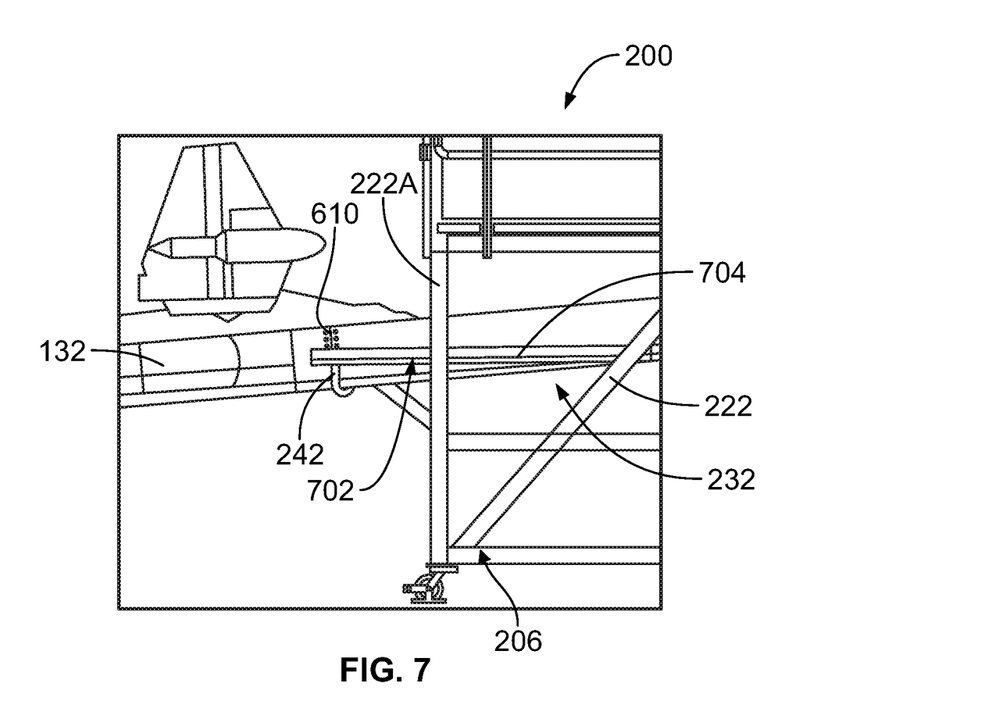
FIG. 7 is a side view of a rear portion of the work platform and the refueling boom according to another alternative embodiment.

FIG. 7 is a side view of a rear portion of the work platform 200 and the refueling boom 132 according to another alternative embodiment. In FIG. 7, the support member 242 is mechanically connected to the frame 206 along a track 702 that extends parallel to the length of the frame 206. The track 702 is defined by two elongated track members 704 that are affixed to the frame members 222 along opposite sides of the trough 232. Only one of the track members 704 is shown in FIG. 7 because the other is disposed behind the refueling boom 132. The track members 704 are oriented horizontally (e.g., perpendicular to the vertically-oriented frame members 222). The track members 704 are affixed, such as via fasteners or welding, to the frame members 222 along opposite sides of the trough 232. The support member 242 is coupled to and extends between the two track members 704 across the trough 232. The support member 242 is selectively movable along the length of the track 702 to reposition the support member 242 relative to the refueling boom 132 and the frame 206. For example, the support member 242 can be slid within the track 702 to a position that allows the support member 242 to align with and engage a seam 610 or other structurally secure area of the boom 132.

Figure 8:
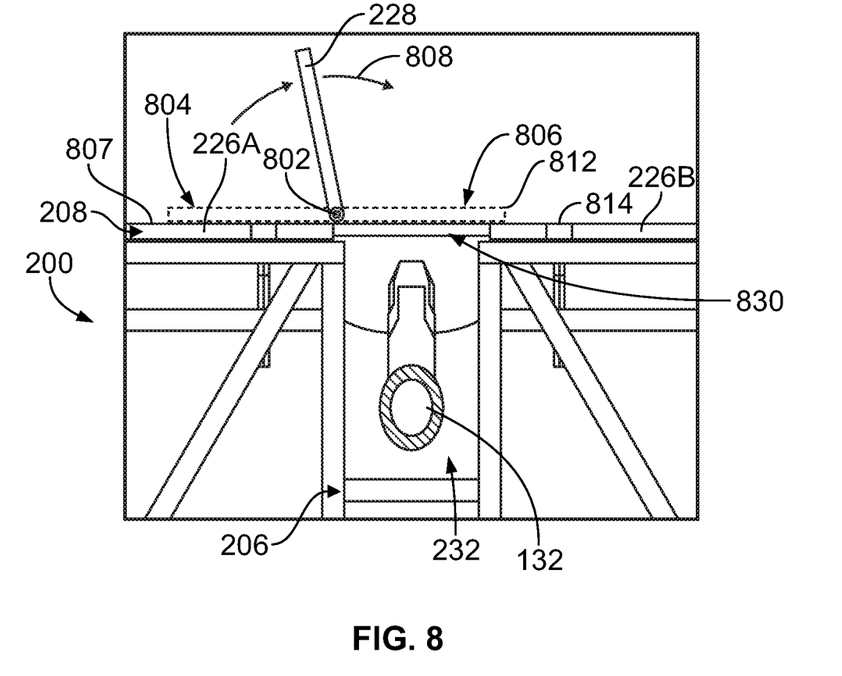
FIG. 8 is a rear view of a portion of the work platform and a cross-sectional view of the refueling boom within the trough of the frame.

FIG. 8 is a rear view of a portion of the work platform 200 and a section view of the refueling boom 132 within the trough 232 of the frame 206. FIG. 8 optionally may represent the embodiment shown in FIGS. 2 through 4. For example, the deck 208 of the work platform 200 includes a lid panel 228 to selectively cover the opening 230 to the trough 232. The lid panel 228 is connected to the first deck panel 226A via an axle 802 located proximate to the opening 230. For example, the axle 802 may be spaced apart from the opening 230 by a distance that is within a designate proximity range of the opening 230, such as 5 cm, 10 cm, 20 cm, or the like. The axle 802 is elongated into the page in the illustrated viewpoint.

The lid panel 228 in the open position 804 (shown in phantom in FIG. 8) is disposed above the first deck panel 226A such that the lid panel 228 overlaps and optionally physically contacts a top side 807 of the first deck panel 226A. From the open position 804, the lid panel 228 is pivotable or rotatable about the axle 802 in an arc direction 808 to extend across the opening 230 in the closed position 806 (also shown in phantom). The arc direction 808 is clockwise in FIG. 8. For example, in the closed position 806, a distal end 812 of the lid panel 228 extends beyond the opening 230 and may overlap a portion of the second deck panel 226B. The distal end 812 optionally may physically contact a top side 814 of the second deck panel 226B in the closed position 806. In the closed position 806, the lid panel 228 blocks access to the trough 232 which allows a technician on the deck 208 to stand and walk above the refueling boom 132.

Although only one lid panel 228 is shown in FIG. 8, in an alternative embodiment multiple lid panels 228 may be installed. For example, a second lid panel may be connected to the second deck panel 226B via an axle located proximate to the opening 230, and the second lid panel may pivot counterclockwise from the open position to the closed position. The two lid panels 228 may physically contact each other, or almost physically contact each other, within the opening 230 to define a planar surface on which the technician can walk above the refueling boom 132 in the trough 232.

Figure 9:
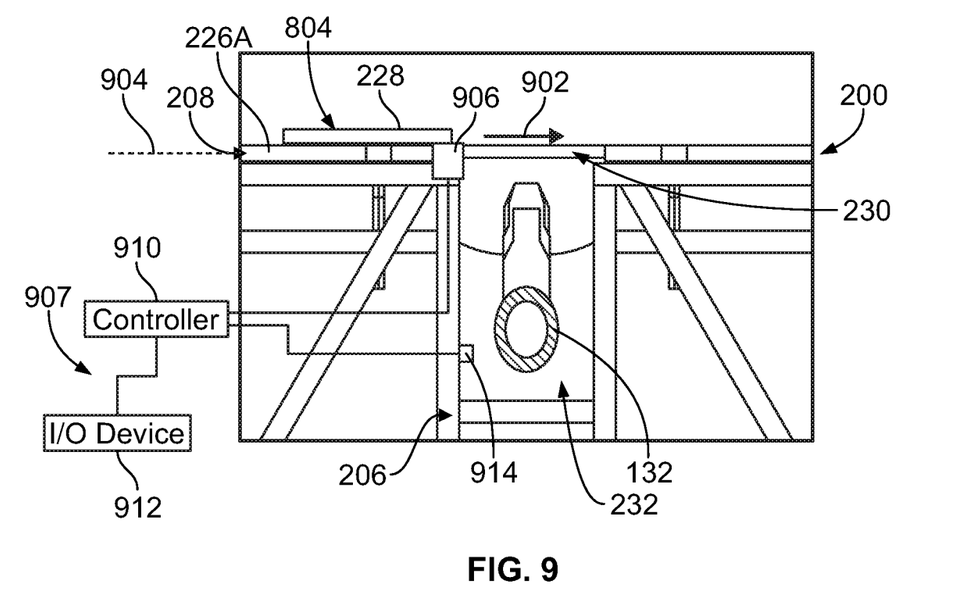
FIG. 9 is a rear view of a portion of the work platform and a cross-sectional view of the refueling boom within the trough of the frame according to another embodiment.

FIG. 9 is a rear view of a portion of the work platform 200 and a section view of the refueling boom 132 within the trough 232 of the frame 206 according to another embodiment. Instead of pivoting about an axle between the closed and open positions, the lid panel 228 in FIG. 9 is configured to slide in a horizontal or lateral closing direction 902 from the open position 804 above the first deck panel 226A to the closed position 806 extending across the opening 230. The closing direction 902 is parallel to a plane 904 or axis of the first and second deck panels 226A, 226B. The lid panel 228 slides in the opposite direction to move from the closed position 806 to the open position 804 for uncovering the opening 230 to the trough 232. Although only one lid panel 228 is shown in FIG. 9, like FIG. 8 the deck 208 may include at least a second lid panel that mirrors the illustrated lid panel 228 and combines with the illustrated lid panel 228 to selectively cover and uncover the opening 230.

In an embodiment, the movement of the lid panel 228 is propelled by an actuator device 906 that is a component of a control system 907. In a non-limiting example, the actuator device 906 is an electrically-powered actuator that slides the lid panel 228 due to rotation of a helical member, rotation of a gear, or the like. For example, the actuator device 906 and the lid panel 228 may form a rack and pinion mechanism in which the actuator device 906 rotates a gear that causes linear movement of the lid panel 228 in the closing direction 902 or the opposite direction. The actuator device 906 may be operably connected to an electrical energy source, such as a battery, which powers the operation of the actuator device 906.

A controller 910 is communicatively connected to the actuator device 906 via a wired or wireless pathway. The controller 910 may represent or include an electric switch that controls a motor of the actuator device 906. Optionally, the controller 910 may include one or more processors and may operate based on program-based instructions (e.g., software). In a non-limiting example, the one or more processors may include microcontrollers, reduced instruction set computers (RISC), application specific integrated circuits (ASICs), logic circuits, GPUs, FPGAs, or any other circuit or processor capable of executing the functions described herein.

The controller 910 controls operations of the actuator device 906, such as when the actuator device 906 operates, the direction the actuator device 906 moves the lid panel, the speed at which the actuator device 906 moves the lid panel 228, and the distance the lid panel 228 is moved by the actuator device 906. The controller 910 is optionally communicatively connected to an input/output (I/O) device 912, such as a handheld control device or a control device integrated onto the work platform 200. The I/O device 912 enables an operator, technician, or other person to selectively control the movement of the lid panel 228 relative to the opening 230. For example, the I/O device 912 may include a first physical or virtual button configured to close the lid panel 228 when selected and a second physical or virtual button configured to open the lid panel 228.

Optionally, the controller 910 operates autonomously to control the movement of the lid panel 228 without requiring receipt of human prompts via the I/O device 912. For example, the controller 910 may be communicatively connected to a sensor 914 that is mounted to the frame 206 in or proximate to the trough 232. The sensor 914 may be an optical position sensor, such as a proximity sensor. The sensor 914 generates sensor data representing a proximity of the refueling boom 132 to the sensor 914. When the sensor data indicates that the refueling boom 132 is within a threshold proximity range of the sensor 914, indicating that the refueling boom 132 is fully loaded within the trough 232, the controller 910 may generate a control signal for controlling the actuator device 906 to move the lid panel 228 from the open position 804 to the closed position 806. Conversely, the controller 910 may control the actuator device 906 to move the lid panel 228 towards the open position in response to the sensor data indicating that the boom 132 has moved outside of the threshold proximity range of the sensor 914. Thus, as the boom 132 is raised upward relative to the trough 232, the control system 907 may automatically recognize such movement of the boom 132 and open the one or more lid panels 228 to allow the boom 132 to pass through the opening 230 without obstruction. The control system 907 described in FIG. 9 can also be implemented with the pivoting lid panel 228 shown in FIG. 8.

Figure 10:
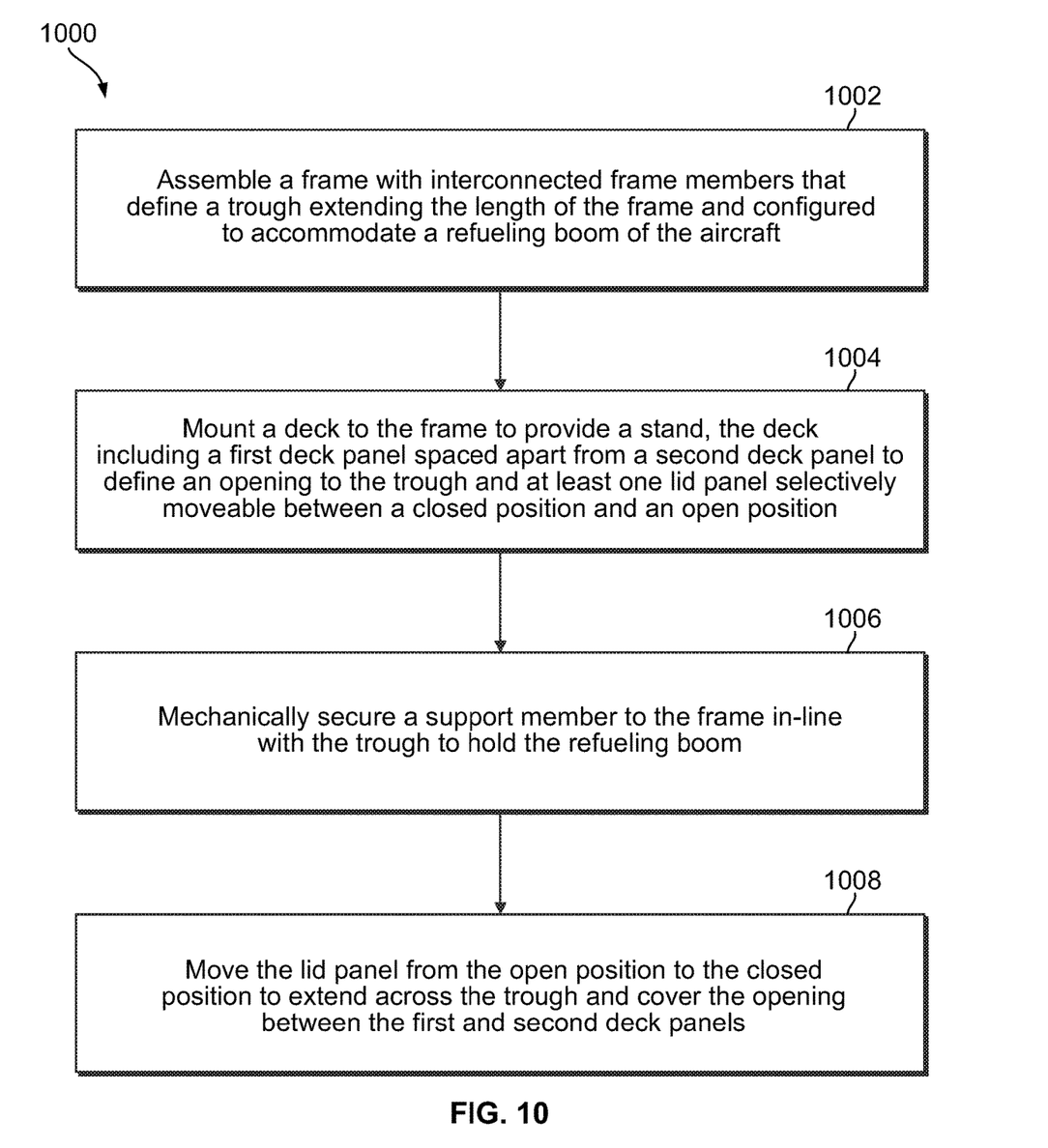
FIG. 10 is a flow chart of a method of assembling a work platform according to an embodiment.

FIG. 10 is a flow chart of a method 1000 for assembling a work platform according to an embodiment. The method 1000 may be performed to construct the work platform 200 of the various embodiments described with reference to FIGS. 2 through 9. The method may be performed on a job-site, such as within an airplane hangar. At 1002, a frame is assembled that has a plurality of interconnected frame members. The frame is assembled such that the frame members define a trough that extends a length of the frame and is configured to accommodate a refueling boom of an aircraft such that the refueling boom extends through the frame within the trough.

At 1004, a deck is mounted to the frame to provide a stand (e.g., an elevated working stand for a technician). The deck includes a first deck panel, a second deck panel, and one or more lid panels. The first deck panel is spaced apart from the second deck panel to define an opening to the trough. The one or more lid panels are selectively movable between a closed position and an open position. In the closed position, the one or more lid panels extend across the trough to cover the opening between the first and second deck panels. In the opening position, the one or more lid panels do not extend across the trough, such that the trough has an unobstructed opening for allowing the refueling boom to enter and/or exit the trough.

At 1006, a support member is mechanically secured to the frame in-line with the trough. The support member is non-rigid and configured to hold the refueling boom when the refueling boom is disposed within the trough of the frame.

At 1008, a lid panel of the one or more lid panels is moved from the open position to the closed position by pivoting the lid panel about an axle and/or sliding the lid panel parallel to a plane of the first and second deck panels. The movement of the lid panel may be provided by an actuator device under the direction of a controller.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A work platform comprising:
    a frame having a plurality of frame members that are interconnected, wherein the frame members define a trough that extends a length of the frame and is configured to accommodate a refueling boom of an aircraft such that the refueling boom extends through the frame within the trough;
    a deck mounted to the frame to provide a stand, wherein the deck includes a first deck panel and a second deck panel spaced apart from each other to define an opening to the trough; and
    a support member mechanically connected to the frame in-line with the trough, wherein the support member is non-rigid and holds the refueling boom when the refueling boom is within the trough.

2. The work platform of claim 1, wherein the trough is disposed between a first section of the frame and a second section of the frame, and wherein a bottom of the trough is defined by multiple frame members of the frame that extend from the first section to the second section.

3. The work platform of claim 1, wherein the frame extends a width from a first side of the frame to a second side of the frame opposite the first side, wherein the trough is spaced apart from each of the first side and the second side.

4. The work platform of claim 1, wherein the support member is located between a first end and a second end of the frame and extends across the trough.

5. The work platform of claim 1, wherein the frame extends from a first end thereof to a second end thereof that is opposite the first end, wherein the support member is attached to and extends between two cantilevered extension arms that are mounted to the frame at the second end, wherein the second end of the frame is located between the support member and the first end of the frame.

6. The work platform of claim 1, wherein the support member is mechanically connected to the frame along a track that extends parallel to the length of the frame, and the support member is selectively movable along the track to reposition the support member relative to the frame.

7. The work platform of claim 1, wherein the deck includes one or more lid panels selectively movable between a closed position and an open position, wherein the one or more lid panels in the closed position extend across the trough to cover the opening between the first and second deck panels, and the one or more lid panels in the open position do not extend across the trough.

8. The work platform of claim 7, wherein the one or more lid panels include a lid panel that is connected to the first deck panel via an axle, wherein the lid panel is disposed on top of the first deck panel in the open position and is configured to pivot about the axle to extend at least partially across the opening in the closed position.

9. The work platform of claim 7, wherein the one or more lid panels are configured to slide parallel to a plane of the first and second deck panels as the one or more lid panels move between the closed position and the open position.

10. The work platform of claim 1, wherein the frame includes casters mounted to the bottom end of the frame.

11. The work platform of claim 1, further comprising guard rails and a gate that extend along a perimeter of the deck, wherein the gate is located at either a first end or an opposite, second end of the frame and is pivotable to extend across the trough and lock to a corresponding one of the guard rails.

12. A work platform comprising:
a frame extending a length from a first end of the frame to a second end of the frame opposite the first end, the frame defining a trough that extends the length of the frame and is configured to accommodate a refueling boom of an aircraft such that the refueling boom extends through the frame within the trough;
a deck mounted to the frame to provide a stand, wherein the deck defines an opening to the trough; and
a support member mechanically connected to the frame in-line with the trough, wherein the support member is non-rigid and holds the refueling boom when the refueling boom is disposed within the trough of the frame.

13. The work platform of claim 12, wherein the frame has a plurality of frame members that are interconnected, and the support member is attached to two respective frame members disposed along opposite sides of the trough such that the support member extends across the trough.

14. The work platform of claim 12, further comprising two cantilevered extension arms that are mounted to the frame at the second end thereof and project beyond the second end away from the frame, wherein the support member is attached to and extends between the two cantilevered extension arms such that the second end of the frame is located between the support member and the first end of the frame.

15. The work platform of claim 12, wherein the support member is a strap that cradles the refueling boom.

16. The work platform of claim 12, wherein the deck includes one or more lid panels selectively movable between a closed position and an open position, wherein the one or more lid panels in the closed position extend across the trough to cover the opening to the trough and the one or more lid panels in the open position do not extend across the trough.

17. A method of assembling a work platform, the method comprising:
assembling a frame that has a plurality of frame members that are interconnected, wherein the frame is assembled such that the frame members define a trough that extends a length of the frame and is configured to accommodate a refueling boom of an aircraft such that the refueling boom extends through the frame within the trough;
mounting a deck to the frame to provide a stand, wherein the deck includes a first deck panel, a second deck panel, and one or more lid panels, the first deck panel being spaced apart from the second deck panel to define an opening to the trough; and
mechanically securing a support member to the frame in-line with the trough, wherein the support member is non-rigid and holds the refueling boom when the refueling boom is disposed within the trough of the frame.

18. The method of claim 17, wherein mounting the deck comprises coupling the one or more lid panels such that the one or more lid panels are selectively movable between a closed position and an open position, wherein the one or more lid panels in the closed position extend across the trough to cover the opening to the trough and the one or more lid panels in the open position do not extend across the trough.

19. The method of claim 18, further comprising moving, via an actuator device, a lid panel of the one or more lid panels from the open position to the closed position by one or more of pivoting the lid panel about an axle or sliding the lid panel parallel to a plane of the first and second deck panels.

20. The work platform of claim 12, wherein the support member is mechanically connected to the frame along a track that extends parallel to the length of the frame, and the support member is selectively movable along the track to reposition the support member relative to the frame.

* * * * *